(12) United States Patent
Wakeen et al.

(10) Patent No.: US 9,863,495 B1
(45) Date of Patent: Jan. 9, 2018

(54) VIBRATION ISOLATOR

(75) Inventors: Paul J. Wakeen, Woodville, WI (US);
Bruce Jacobs, Winneconne, WI (US);
Craig Shirley, Hudson, WI (US)

(73) Assignee: STILLPOINTS LLC, Hudson, WI (US)

( * ) Notice: Subject to any disclaimer, the term of this patent is extended or adjusted under 35 U.S.C. 154(b) by 1455 days.

(21) Appl. No.: 12/557,279

(22) Filed: Sep. 10, 2009

Related U.S. Application Data

(60) Provisional application No. 61/096,682, filed on Sep. 12, 2008.

(51) Int. Cl.
*F16F 15/02* (2006.01)

(52) U.S. Cl.
CPC .................................. *F16F 15/021* (2013.01)

(58) Field of Classification Search
CPC ...... F16F 15/021; F16F 2230/14; E04H 9/023
USPC ....... 267/195, 196, 201, 205, 206, 258, 136, 267/182; 248/562, 568, 603, 636, 637, 248/638
See application file for complete search history.

(56) References Cited

U.S. PATENT DOCUMENTS

| | | | |
|---|---|---|---|
| 2,239,113 A * | 4/1941 | O'Connor ..................... | 267/201 |
| 2,530,072 A * | 11/1950 | O'Connor ..................... | 267/201 |
| 3,614,084 A * | 10/1971 | Brown .......................... | 267/153 |
| 4,480,881 A | 11/1984 | Fujimori | |
| 4,595,167 A * | 6/1986 | Tangorra et al. ............. | 248/638 |
| 4,838,112 A | 6/1989 | Barner | |
| 4,881,350 A | 11/1989 | Wu | |
| 5,330,165 A | 7/1994 | Van Goubergen | |
| 5,364,059 A | 11/1994 | Kimoshita et al. | |
| 5,599,106 A | 2/1997 | Kemeny | |
| 5,599,108 A | 2/1997 | Ochiai et al. | |
| 5,681,023 A | 10/1997 | Sheydayi | |
| 5,905,804 A * | 5/1999 | Lee ............................... | 381/386 |
| 6,296,238 B1 | 10/2001 | Lund-Andersen | |
| 6,315,455 B1 | 11/2001 | Tanaka et al. | |
| 6,357,717 B1 | 3/2002 | Kennard, IV | |
| 6,499,570 B2 | 12/2002 | Chu | |
| 6,536,736 B2 | 3/2003 | Wayne et al. | |
| 6,539,821 B2 | 4/2003 | Bugosh | |
| 6,655,668 B1 | 12/2003 | Wakeen et al. | |

OTHER PUBLICATIONS

Priority Document: U.S. Appl. No. 61/096,682, filed Sep. 12, 2008; Inventors: Wakeen et al.
http://aurios.net/tech-talk,—Body Wave Transmission Reduction. pdf, 2008.
http://aurios.net/tech-talk,—Aurios bearings Improve CD Player Performance.pdf , 2008.

* cited by examiner

*Primary Examiner* — Xuan Lan Nguyen
(74) *Attorney, Agent, or Firm* — Vidas, Arrett & Steinkraus

(57) ABSTRACT

In some embodiments, a vibration isolator comprises a housing having a base portion and a wall portion. A plurality of bearings are disposed within the housing. The bearings are arranged in a configuration comprising a plurality of layers. A first layer comprises a bearing and a second layer comprises a plurality of bearings. Each bearing in the second layer contacts the wall portion of the housing. Each bearing comprises a plurality of contact points in contact with another portion of the vibration isolator, and no two contact points of a bearing are diametrically opposed.

20 Claims, 8 Drawing Sheets

VIBRATION ISOLATOR

CROSS-REFERENCE TO RELATED APPLICATIONS

This application claims the benefit of U.S. Provisional Application No. 61/096,682, filed Sep. 12, 2008, the entire disclosure of which is hereby incorporated herein by reference.

BACKGROUND OF THE INVENTION

Unwanted vibrations in many types of industrial, commercial, military and civilian equipment can lead to degradation in the performance of the equipment. Two examples of such equipment are audio and optical devices. Vibration, movement or shocks in audio equipment including speakers, amplifiers, microphones and audio mixers can lead to degradation in the quality of the signal output from the device. Such vibrations can be present throughout various components of these devices, even in circuit boards on a microscopic level. In some instances, the flow of electricity through electrical components, such as the charging and discharging of capacitors, can degrade the performance of sensitive equipment. Similarly, vibrations in optical based equipment such as telescopes, microscopes, compact disk players, digital video discs, computer disk drives, photographic equipment, etc., can lead to degradation in the information received from the device. In another example, non-isolated vibrations in electronic equipment, particularly vibrations resulting from transformers, fans or other cooling units in computers and computer components, may lead to a reduction in performance and/or functional life of the computer or component. Additionally, vibrations in precision medical equipment, such as robotic arms, can have a negative impact on the precision of the device.

In many cases, rotating assemblies create vibrations that are undesirable in their surrounding environment. This is especially true where the rotating assembly includes a pivotal joint, such as a u-joint, or CV (constant velocity) joint. Other examples of rotating assemblies include turntables, disc drive bearings, etc.

There have been many devices constructed to reduce and isolate unwanted vibrations. There remains, however, a need in the art for effective, affordable isolation devices which are capable of effectively isolating apparatuses and reducing, if not eliminating unwanted vibrations.

U.S. Pat. No. 6,655,668 is hereby incorporated herein by reference in its entirety.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In some embodiments, a vibration isolator comprises a housing having a base portion and a wall portion. A plurality of bearings are disposed within the housing. The bearings are arranged in a configuration comprising a first layer and a second layer. The first layer comprises a bearing and the second layer comprises a plurality of bearings. Each bearing in the second layer contacts the wall portion of the housing. Each bearing comprises a plurality of contact points in contact with another portion of the vibration isolator, and no two contact points of a bearing are diametrically opposed.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE INVENTION

A detailed description of the invention is hereafter described with specific reference being made to the drawings.

DETAILED DESCRIPTION OF THE INVENTION

Figure 1:
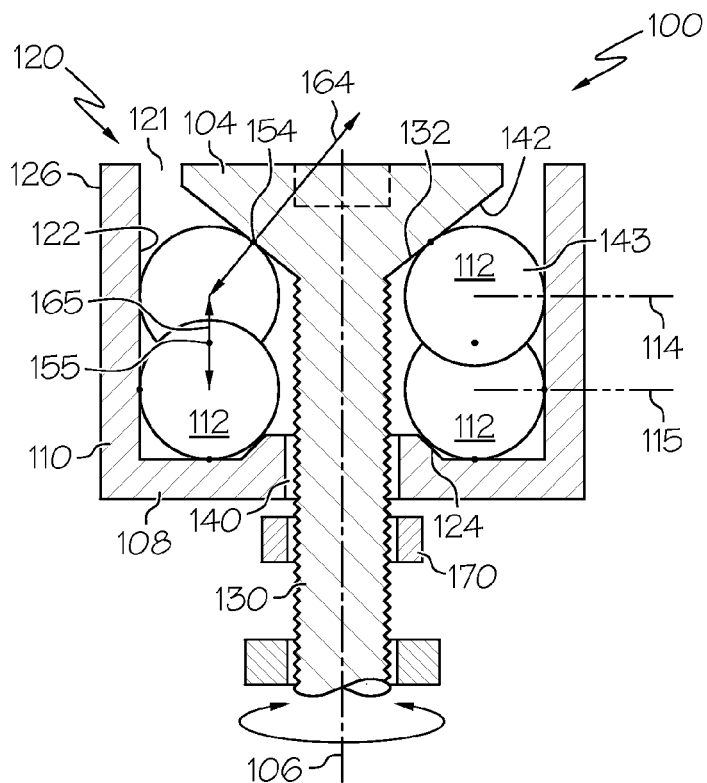
FIG. 1 shows a cross-sectional view of an embodiment of a vibration isolator.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

In some embodiments, the invention is directed to a device for isolating vibration. As shown in FIG. 1, the device 100 comprises a housing 120 and a plurality of housed bearings 112 disposed within the housing 120. The housing 120 comprises a first portion 104 and a second portion 126. The second portion 126 can comprise a base portion 108 and a wall portion 110. In some embodiments, the wall portion 110 can be cylindrical and can define a central axis 106. In some embodiments, the first portion 104 can be separated from the second portion 126 by a gap 121, which can reduce vibration transmission between the first portion 104 and second portion 126. Desirably, the first portion 104 does not contact the second portion 126 directly.

In some embodiments, the bearings 112 are arranged in a first layer 114 and a second layer 115. In some embodiments, each bearing 112 of a given layer is oriented with its center/centroid on a common plane. In some embodiments, each bearing 112 of a given layer is oriented with a portion of its outer surface on a common plane. The first layer 114 can be disposed on the second layer 115, such that each bearing in the first layer 114 contacts at least one bearing in the second layer 115. In some embodiments, each bearing in the first layer 114 contacts multiple bearings in the second layer 115.

Bearings 112 oriented in the first layer 114 can be considered first layer bearings. Bearings 112 oriented in the second layer 115 can be considered second layer bearings, etc.

In some embodiments, each bearing 112 in the device 100 is the same size. In some embodiments, the device 100 can include bearings 112 having different sizes. Differently sized bearings 112 can be distributed in the same layer and/or throughout multiple layers. In some embodiments, the bearings 112 of a given layer can be similar to one another, and different from bearings 112 of another layer.

The bearings 112 can be made of any suitable materials including, but not limited to polymers such as polyoxymethylene (POM); various metals such as stainless steel, other steel alloys, chrome, chrome steel or other metals or alloys; ceramics including oxides such as alumina, zirconia, etc., crystalline oxides such as Corundum, ruby, sapphire, etc; carbides such as tungsten carbide, etc.; and other ceramic composites; glass; marble and other suitable types of stone, etc. In a preferred embodiment, the bearings 112 comprise an aluminum oxide ceramic. Use of materials such as aluminum oxide ceramics enhances the rate of energy transfer between adjacent bearings, and can improve the isolation of high frequency vibrations. In some embodiments, a bearing 112 comprises a 3/16" diameter ceramic sphere.

Bearings 112 can all be comprised of the same material or they can be of different materials. In some embodiments, the bearings 112 can be provided with a surface coating, for example to reduce friction. In some embodiments, a coating can comprise a fluoropolymer such as polytetrafluoroethylene. The material selected for the bearings 112 affects the vibration isolating properties of the device 100. Where the device 100 is used with audio equipment, material selection of the bearings can affect tone. Material selection of the housing first portion, housing second portion, and other components can also affect tone. Desirably, the bearings 112 are very rigid and have a low coefficient of friction.

In various embodiments, the housing 120 can be made from any suitable material including any material suitable for the bearings 112 as described herein. The housing material(s) are desirably highly rigid, such as steel, steel alloys including stainless steel, ceramic materials or other materials with high rigidity. In some embodiments the housing first portion 104 comprises the same material as the housing second portion 126; however, the housing second portion and housing first portion need not necessarily be comprised of the same material.

The embodiment of FIG. 1 shows two layers of bearings 112, wherein each layer 112 comprises the same number of bearings 112. In this arrangement, the device may have as few as three (3) bearings in each of the first and second layers 114, 115, and various embodiments can have any suitable number of bearings 112 in each layer 114, 115. In FIG. 1, the first layer 114 is comprised of five (5) bearings and the second layer 115 is comprised five (5) bearings.

As shown in FIG. 1, the housing first portion 104, also referred to as a retainer, can comprise a conical portion 132. The conical portion 132 contacts each bearing 112 of the first layer 114. The retainer 104 can work in conjunction with the second portion 126 of the housing to collectively place compressive forces on the bearings 112. In some embodiments, the retainer 104 can be attached to a post 130, which can be threaded. The housing second portion 126 is shown with a hole 140 in the base 108, through which the post protrudes. Vibration acting on the post 130 is transferred to the first layer of bearings 112 at first contact points 154. First contact lines 164 extend normal to the contacting surface 142 of the conical portion 132 at the first contact points 154. The first contact lines 164 represent the vector direction of forces traveling between the contacting elements.

As shown in the embodiment of FIG. 1, bearings 112 of the first layer 114 also contact the housing 120 along the housing interior wall 122. Bearings 112 of the second layer 115 also contact the housing 120 along the housing interior wall 122. As shown here, bearings 112 of the second layer 115 also contact bearings 112 of the first layer 114 at second contact points 155. Second contact lines 165 extend normal to the surfaces of the bearings 143 at the second contact points 155, respectively, and represent the vector direction of forces traveling between bearings 112 of the first and second layers 114, 115. Due to the three dimensional nature of the device 100, the first contact lines 164 extend nonparallel to the second contact lines 165. Bearings 112 of the second layer 115 are shown contacting the base portion 108 of the housing 120.

Housing 120, shown in FIG. 1, has an annular ledge 124 to retain the bearings 112 and prevent them from contacting the post 130. Distal to the housing 120 is a nut 170 threaded to the post 130, which can limit movement of the retainer 104 with respect to housing second portion 126. In some embodiments, the nut 170 does not tighten against the housing 120, but allows some movement between the retainer 104 and the housing second portion 126. In some embodiments, the various components are held in contact with one another by gravity. Where the nut 170 is not tightened against the housing 120, the post 130 may be configured to rotate within the housing 120.

In some embodiments, the housing 120 can be crimped in such a way that retains the retainer 104 but allows the necessary movement. For example, referring to FIG. 1, in some embodiments, the housing second portion 126 can extend above the retainer 104 and be crimped in a way that allows movement between the retainer 104 and the housing second portion 126, but prevents movement to the point that bearings 112 could escape the housing.

In some embodiments, the post 130 is allowed to move within the housing second portion 126, for example rotating and/or wobbling. Where the post 130 is permitted to wobble (e.g., due to vibration), reaction of the bearings 112 in the various layers dissipate energy, thereby isolating unwanted vibration. Additionally, the post 130 can be permitted to move relative to the hole 140; however, the movement is desirably limited such that the bearings 112 remain retained within the housing 120.

In various embodiments, the post 130 can be unthreaded, partially-threaded or fully threaded. In some embodiments, the post 130 can comprise a cable or string, for example being swaged to a portion of the vibration isolator, such as the retainer 104. A rigid post 130 will typically transmit tensile and compressive forces, whereas a cable or string typically transmits tension but does not transmit compression.

Figure 2:
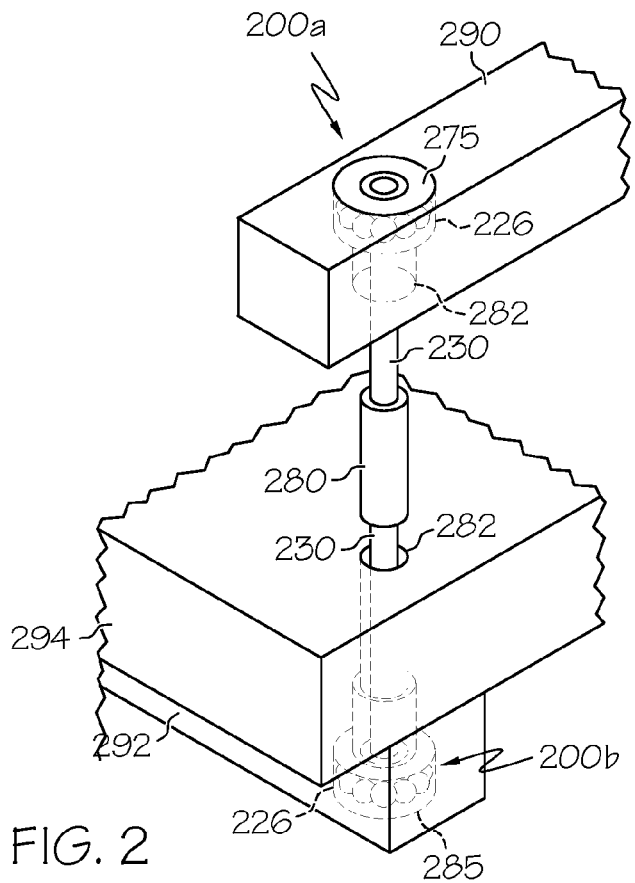
FIG. 2 shows vertical support that uses a plurality of vibration isolators.

FIG. 2 shows a pair of the vibration isolating devices 200 coupled together. The first device 200a is shown as being supported by a first support structure 290. The first support structure 290 is shown supporting the housing second portion 226. First device 200a is coupled to a second device 200b that is inverted relative to device 200a. Vibration isolating device 200b is attached to a second support structure 292. A shelf 294 is placed on the second support structure 292. Second support structure 292 can have a counterbored hole 285 that retains device 200b. Similarly, first support structure 290 can have a counterbored hole 285 that retains device 200a. First support structure 290, second support structure 292, and shelf 294 have through holes 282 concentric with counterbored holes 285.

First device 200a is coupled to second device 200b with a coupler 280. Coupler 280 can be screwed to each post 230, or it can be crimped, welded, glued, or affixed by any other well known method. In some embodiments, a coupler 280 comprises a tubular member having a threaded interior portion.

Figure 3:
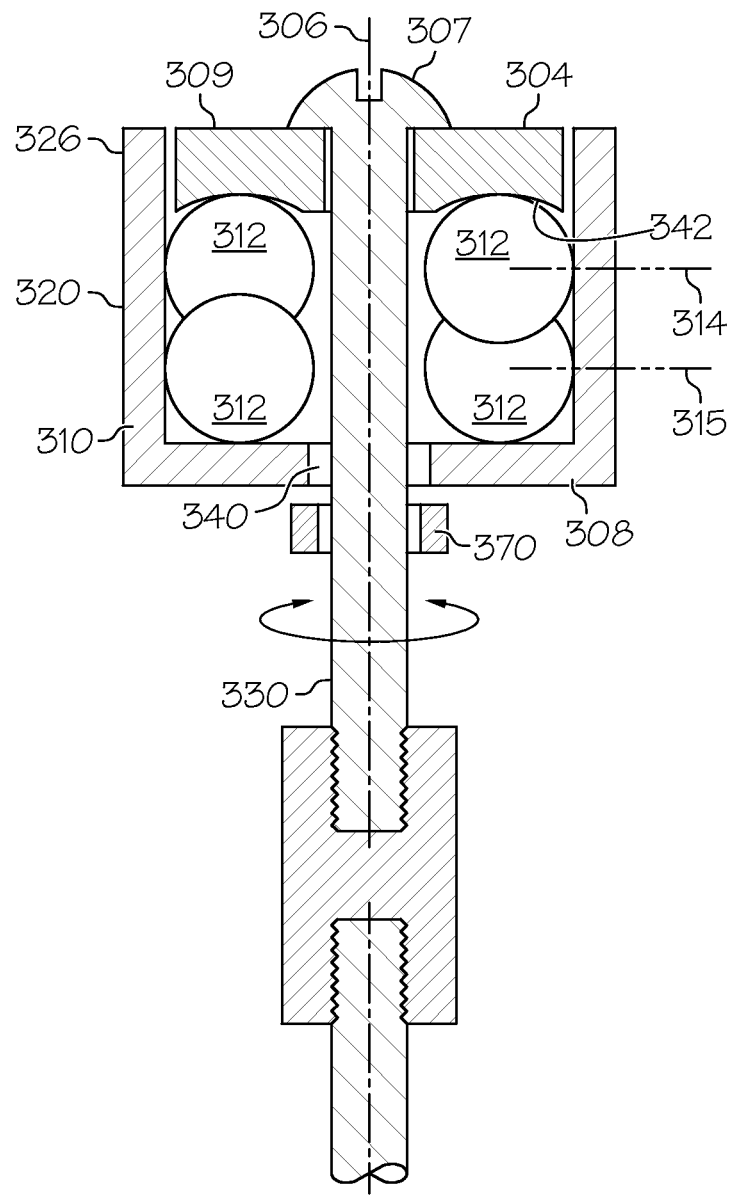
FIG. 3 shows a cross-sectional view of another embodiment of a vibration isolator.

In the embodiment shown in FIG. 3, the housing 320 comprises a housing first portion 304 and housing second portion 326. The housing first portion 304 can alternatively be referred to as a retainer. In some embodiments, a retainer 304 comprises an annular washer or race 309 and a head portion 307. In some embodiments, the race 309 comprises a concave surface 342, which is configured to retain the bearings 312 within the housing second portion 326. The head portion 307 restrains the race 309. The head portion 307 may be affixed to a post 330. The post 330, in conjunction with the head portion 307, may comprise a machine-screw or bolt. The housing 320 is configured with a hole 340 through which the post 330 protrudes. In various embodiments the post 330 can be unthreaded, partially-threaded, or fully threaded.

The housing second portion 326 comprises a base portion 308 and a wall portion 310. In some embodiments, the wall portion 310 can be cylindrical and can define a central axis 306.

The embodiment shown in FIG. 3 has a nut 370 threaded on the post 330. The nut 370 can be permitted to tighten against the housing 320, or there can be a gap between the nut 370 and the housing. There may be a washer or other material disposed between the nut 370 and the housing 320. Where the nut 370 is not tight against the housing 320 (or washer, etc.), the post 330 is permitted to wobble and translate within the housing 320. A gap between the nut 370 and the housing 320 of approximately 1 mm is typically sufficient to allow full function of vibration isolator while simultaneously insuring retention of the bearings within housing 320, although the specific gap size can depend upon the relative sizes of the various components of the embodiment at issue. A thread locking compound may be disposed on the nut 370 to prevent it from turning on post 330. Alternatively, any known method may be used to prevent the nut 370 from rotating on the shaft, including but not limited to hardware such as castle nuts and Nylock nuts, or adhesives, welding or crimping. In some embodiments, the post 330 is permitted to wobble 5-10 degrees.

Figure 4:
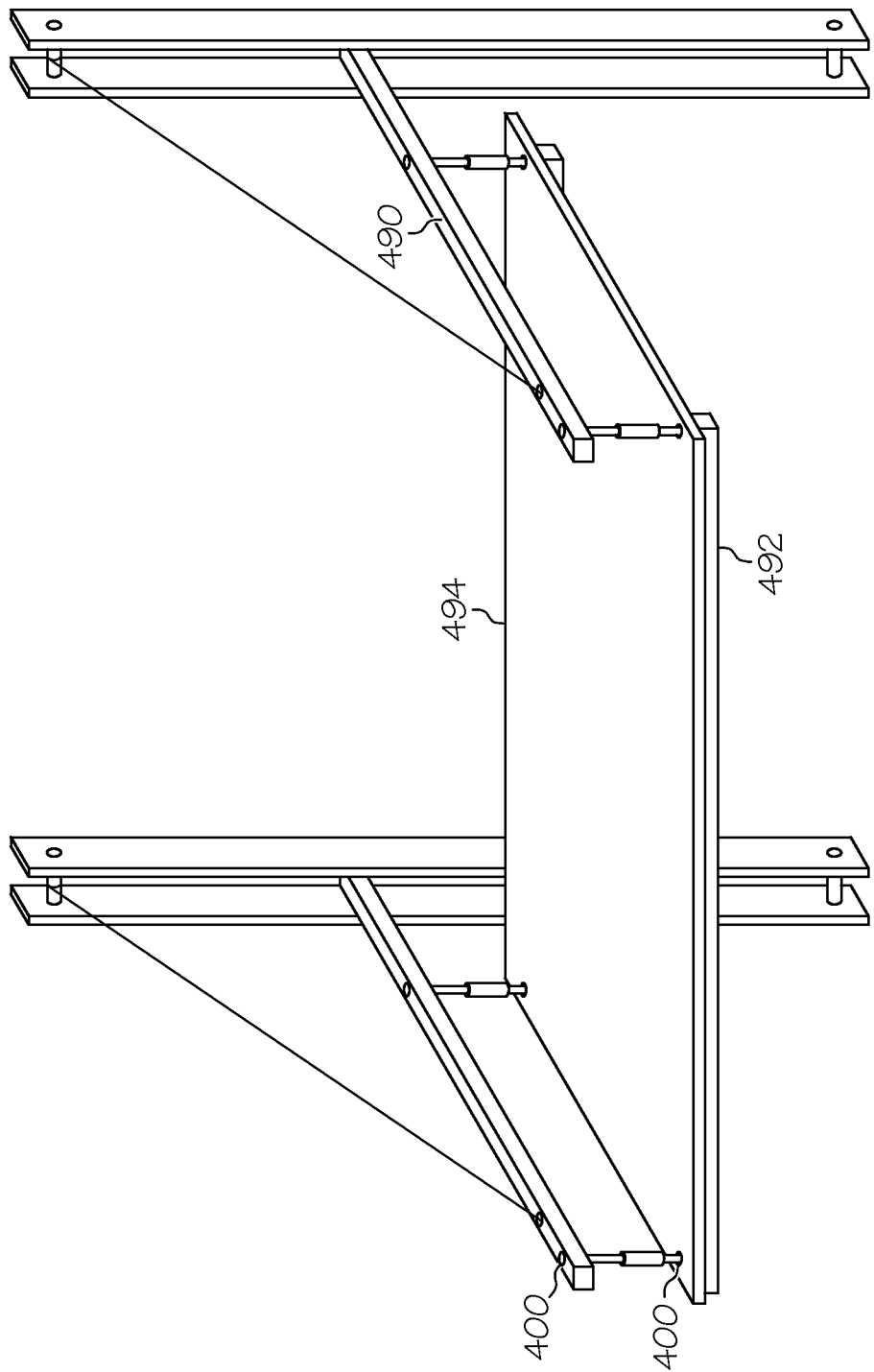
FIG. 4 shows a shelving unit that uses a plurality of vibration isolators.

Shown in FIG. 4 is a suspended rack or shelf 494. The shelf 494 is suspended by four pairs of isolation devices 400, for a total of eight (8) vibration isolating devices 400. FIG. 2 shows a more detailed view of one embodiment of each pair of vibration isolating devices.

The first support structure(s) 490 in FIG. 4 are shown supported by tension wires that attach to the main vertical supports. Second support structure(s) 492 are suspended from the first support structure(s) 490, which provides two levels of isolation between the second support structure(s) 492 and the first support structure(s) 490. The shelf 494 can rest upon the second support structure(s) 492.

The shelf 494 can support audio equipment such as a CD, DVD, or record player; or it can be used to support speakers, amplifiers, or a mixer, for example. The shelf 494 can also be used to support optical equipment such as a microscope. Vibrations given off by the equipment (not shown) are isolated from the surrounding environment, and vibrations from the surrounding environment are isolated from the equipment by the vibration isolating devices 400. The devices 400 are shown here coupled together in pairs. However, the devices 400 do not have to be arranged in pairs. The second support structure 492 can also be suspended from devices 400 arranged individually, wherein the support structure is attached to the housing second portion and the shelf is attached to the post or housing first portion (not shown). Alternatively, the second support structure 492 can be attached to the housing second portion and the first support structure 490 attached to the post.

Where a hanging rack or shelf is supported by one or more vibration isolators, the rack may be permitted to swing horizontally in all directions without misalignment of the bearings to the race, retainer or housing. In some embodiments the rack may have free play movement as much as 1 inch horizontally. Preferably, where a turntable is disposed on the rack, $\frac{1}{16}$ of an inch of horizontal travel is adequate.

In some embodiments, for example where multiple shelves are supported by stacked or coupled isolators, aligned isolators may be connected to one another using a rigid shaft or swaged cable. In some embodiments, additional shelves can be hung from the second support structure(s) 492.

In some embodiments, isolators 400 can be placed on a supporting base, and a shelf 494 can rest on top of the isolators 400.

Figure 5:
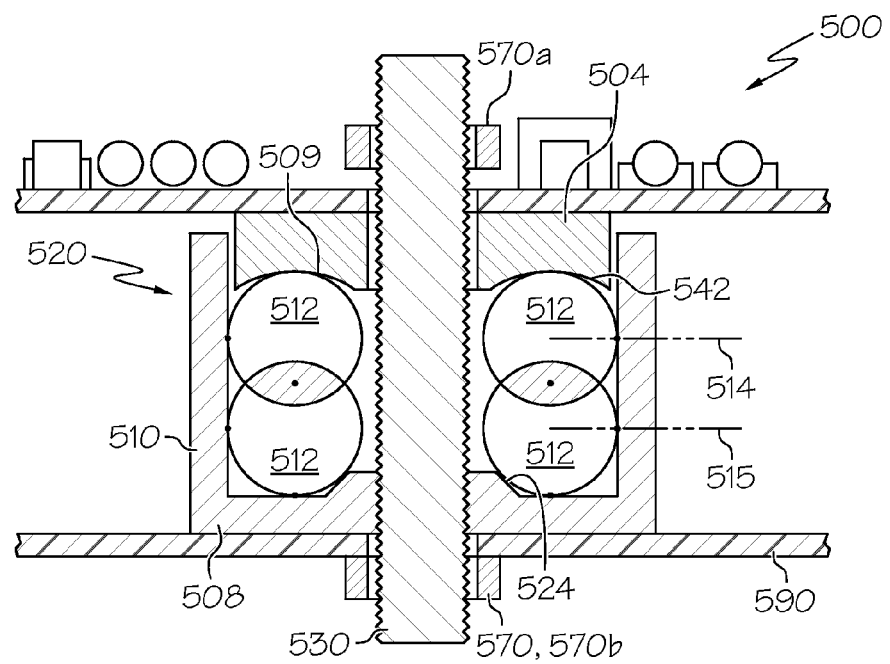
FIG. 5 shows a cross-sectional view of an embodiment of a vibration isolator being used to support a circuit board.
Figures 6, 7:
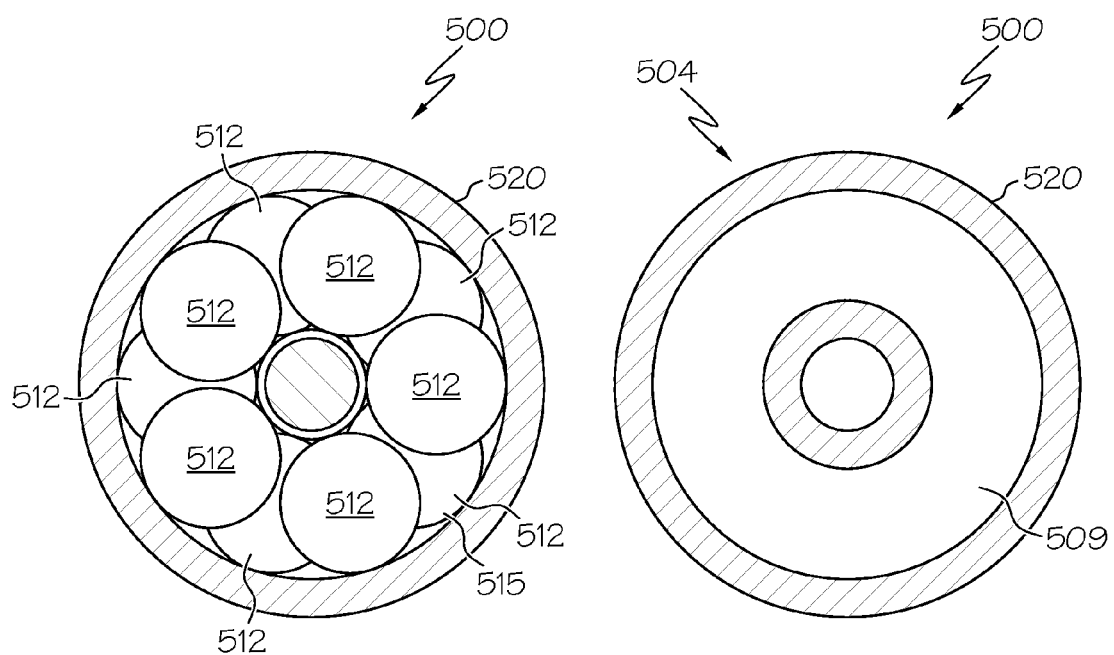
FIG. 6 shows a plan view of a portion of an embodiment of a vibration isolator.
FIG. 7 shows an embodiment of a housing retaining member.

As shown in FIGS. 5, 6, and 7, in some embodiments, a vibration isolating device 500 comprises a plurality of bearings 512 arranged in a first layer 514 and a second layer 515. Bearings 512 are disposed within a housing 520, the first layer 514 disposed on the second layer 515. In some embodiments, the first layer 514 has five (5) bearings and the second layer 515 has five (5) bearings. The housing 520 can comprise a first portion/retainer 504, which in some embodiments can comprise a race 509. The race 509 has a concave surface 542 which is configured to retain the bearings 512. A post 530 is disposed through the housing 520.

FIG. 5 shows a circuit board disposed on the first portion/retainer 504. In some embodiments, a vibration isolator can be used to support an article, such as a circuit board. The article will be isolated from vibrations present in the underlying support structure 590. In some embodiments, the article can contact a portion of the housing 520, such as the retainer 504.

In some embodiments, a securing device can be used to limit the amount of movement of the retainer 504 with respect to the housing base 508, which can prevent the bearings 512 from moving out of the housing 520. In some embodiments, a securing device comprises a rod 530 and at least one nut 570. As shown in FIG. 5, a rod 530 may be threaded. The housing base portion 508 may be threaded so as to engage the rod 530. A nut 570a can be positioned on the rod 530 in a location that limits travel of the retainer 504, and in some embodiments, limits travel of an article supported by the retainer 504. A second nut 570b can be used to secure the rod 530 and the housing base member 508 to a support 590. For example, the second nut 570b can be tightened to sandwich a first support structure 590 between the nut 570b and the housing base portion 508. Preferably, the base 508 and wall 510 portions of the housing 520, as well as the rod 530, do not directly contact the retainer 504.

Bearings 512 of the first layer 514 and the second layer 515 contact the wall portion 510 of the housing 520. Bearings 512 of the second layer 515 contact the base portion 508 of the housing 520. The base portion 508 comprises an annular ledge 524 to retain the bearings 512 of the second layer 515 and prevent them from contacting post 530. In some embodiments, bearings 512 are permitted to contact post 530.

FIG. 6 shows a top view of the device 500 with the retainer 504 removed.

FIG. 7 shows a view of the retainer 504, showing an embodiment of a race 509 or groove.

In various embodiments, a vibration isolator can have any suitable number of layers of bearings, and each layer can comprise any suitable number of bearings.

Figure 8A:
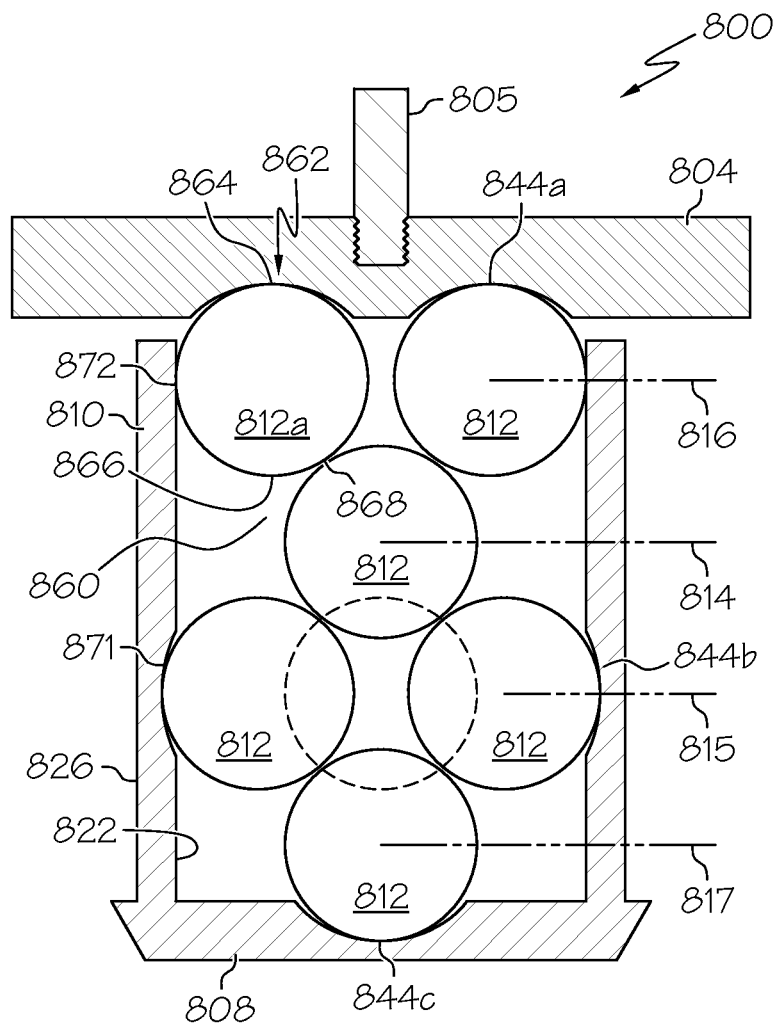
FIG. 8A shows another embodiment of a vibration isolator.

FIG. 8A shows an embodiment of a vibration isolating device 800 with a first layer 814, a second layer 815, a third layer 816 and a fourth layer 817 of bearings 812. The first layer 814 has one (1) bearing, the second layer 815 has five (5) bearings, the third layer 816 has four (4) bearings and the fourth layer 817 has one (1) bearing. A housing first portion or retainer 804 contacts the third layer 816 of bearings and retains the bearings inside the housing second portion 826. In some embodiments, the housing first portion 804 has a spindle 805 protruding extending in a direction away from the bearings.

The device can comprise a plurality of concave surfaces 844a, 844b, 844c. In some embodiments, a concave surface or annular groove 844a is disposed on an interior surface of the retainer 804. Bearings 812 of the third layer 816 contact the retainer 804 directly.

The housing second portion 826 has a base portion 808 and a wall portion 810. In some embodiments, the base portion 810 has a concave surface 844c. The bearing 812 of the fourth layer 817 is disposed in the concave surface 844c. Concave surface 844c is preferably configured to minimize the area of contact with bearing 812 of the fourth layer 817. Desirably, the curvature of the concave surface 844c is different from the curvature of the bearing 812. For example, a radius of curvature of the bearing 812 is smaller than a radius of curvature of the concave surface 844c. In some embodiments, for example where the fourth layer 817 comprises multiple bearings 812, the concave surface 844c can comprise an annular groove (not shown) in the base portion 808.

The wall portion 810 comprises a first wall portion 871 and a second wall portion 872. The bearings 812 of the second layer 815 are in contact with the first wall portion 871, while bearings 812 of the third layer 816 are in contact with the second wall portion 872. As shown in FIG. 8A, the first wall portion 871 is configured as a concave surface 844b forming an annular groove around the interior wall 822 of the housing second portion 826. The concave surface 844b is designed to retain the bearings 812 of the second layer 815 and preferably configured to minimize the area of contact with bearings 812. In some embodiments, a diameter of the first wall portion 871 is greater than a diameter of the second wall portion 872. The wall portions 871, 872 are desirably sized according to the specifics of the bearings used in the device, or vice versa.

In some embodiments, the housing first portion/retainer 804 is generally rotatable with respect to the housing second portion 826. In some embodiments, the retainer 804 comprises a supporting surface of an accompanying device, such as a turntable of a record player.

A vibration can be introduced into the device either through the housing first portion 804 or the housing second portion 826, or both. In some embodiments, the portions 804, 826 and bearings 812 are biased together by gravitational forces, but are not fixedly attached. The housing first portion 804 can be moveable with respect to the housing second portion 826 such that vibrations present in one portion 826 can be isolated from the other portion 804 as much as possible. The bearings 812 can further move with respect to one another, and the layers 814-817 can move with respect to one another. The movement can reduce the transmission of impulse/vibration forces between adjacent components of the device.

Energy can also be dissipated into voids 860 that exist between bearings 812 in the housing 808, 810. For example, a bearing 812a can receive incoming vibrational energy 862 from the retainer 804. Desirably, the retainer 804 is configured to contact the bearing 812a at a single point 864. The energy 862 travels across the bearing 812a and would create a maximum energy transfer to a point 866 that is diametrically opposed to the incoming energy point 866. Desirably, the bearing 812a is not supported at the diametrically opposed point 866. Instead, the bearing 812a is supported at an off-axis support point 868, for example where the bearing 812a contacts another bearing 812. This allows a portion of the input energy 862 to be dissipated into void space 860 that surrounds the maximum energy transfer point 866. Similar dissipation can occur with respect to each bearing 812 in the device. The concept of the maximum energy transfer point 866 is discussed further below with respect to FIG. 11.

In some embodiments, each bearing 812 contacts other portions of the vibration isolator 800, such as other bearings 812 and/or the housing 820, at a plurality of contact points, and no two contact points on a given bearing are diametrically opposed. Thus, if a line spanning from the centroid of the bearing 812 were drawn to each contact point, each contact point axis line would be oriented at an angle to every other contact point axis line for that bearing.

Figure 8B:
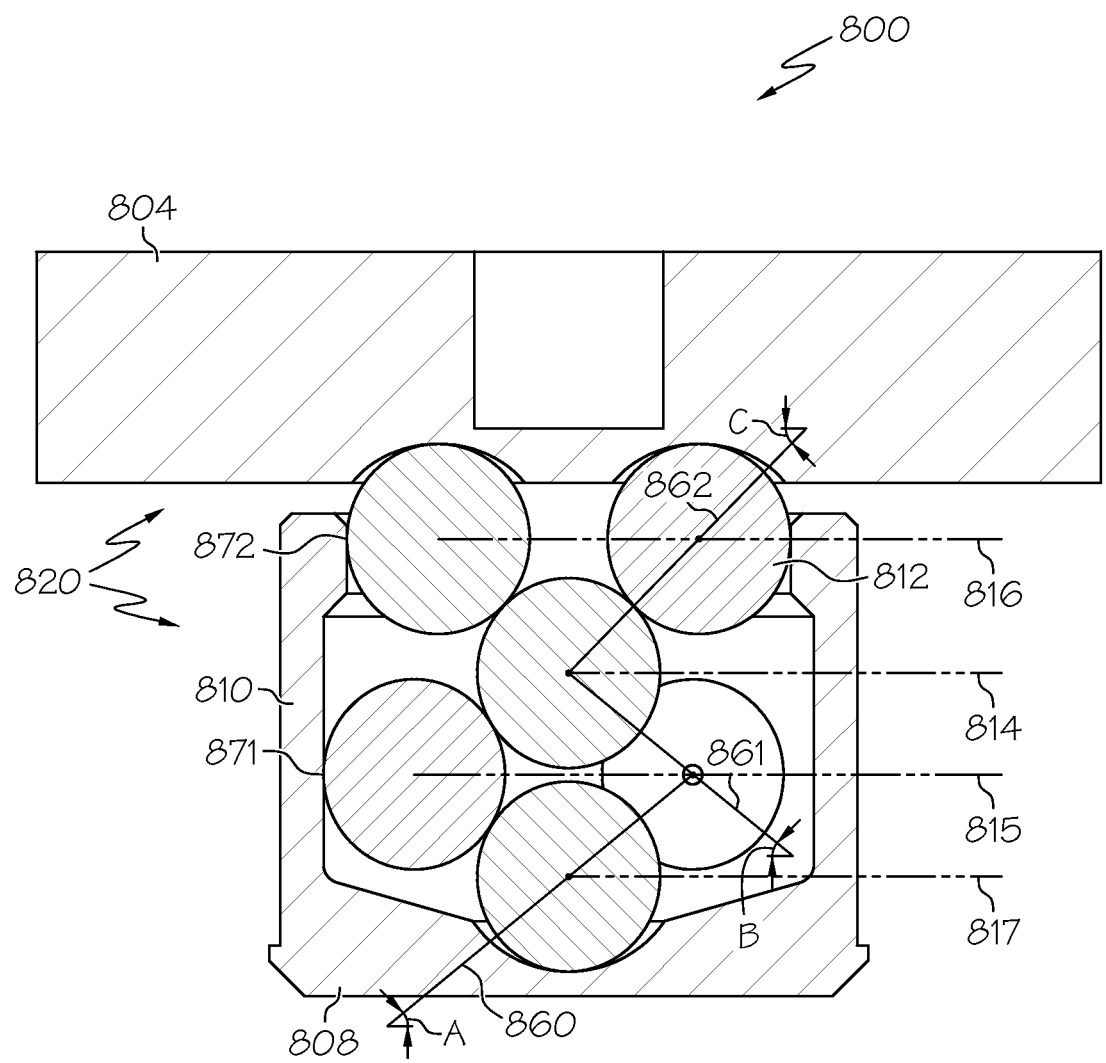
FIG. 8B shows another embodiment of a vibration isolator.

FIG. 8B shows another embodiment of a vibration isolator 800. The housing 820 illustrated in FIG. 8B is shaped differently from the housing of FIG. 8A. While the embodiment of FIG. 8A achieves an offset formed in the housing wall portion 810 by having a groove formed in the first wall portion 871, the embodiment of FIG. 8B achieves an offset between the first wall portion 871 and the second wall portion 872 by having a raised flange in the second wall portion 872.

The relative angles between bearings 812 in the various layers 814-817 is slightly different from the embodiment of FIG. 8A. FIG. 8B shows a line 860 that extends between the centroid of a bearing 812 in layer 817 and the centroid of a bearing 812 in adjacent layer 815. This line 860 forms an angle A with a horizontal reference line. A line 861 extends between the centroid of a bearing 812 in layer 815 and the centroid of a bearing 812 in adjacent layer 814. This line 861 forms an angle B with a horizontal reference line. A line 862 extends between the centroid of a bearing 812 in layer 814 and the centroid of a bearing 812 in adjacent layer 816. This line 862 forms an angle C with a horizontal reference line. In various embodiments, the angles A, B, C can have any suitable value, and their values are not dependent upon each other. In some embodiments, various angles A, B, C can all be the same. In some embodiments, various angles A, B, C can each be different. In some embodiments, two of the three angles A, B, C can be the same, and be different from the remaining angle. As shown in FIG. 8B, angle C is larger than angles A and B. In some embodiments, angles A and B are approximately 32 degrees, and angle C is approximately 43 degrees.

The vibration isolators disclosed herein encompass any suitable combination and arrangement of bearings in layers, and the relative angles between bearings in various layers can be adjusted as necessary to vary the isolation capabilities of the embodiment. While all embodiments will isolate vibrations across a range of frequencies, different embodiments having different layers and different angles between bearings may each be particularly well suited for isolating frequencies in a specific range.

Figure 9:
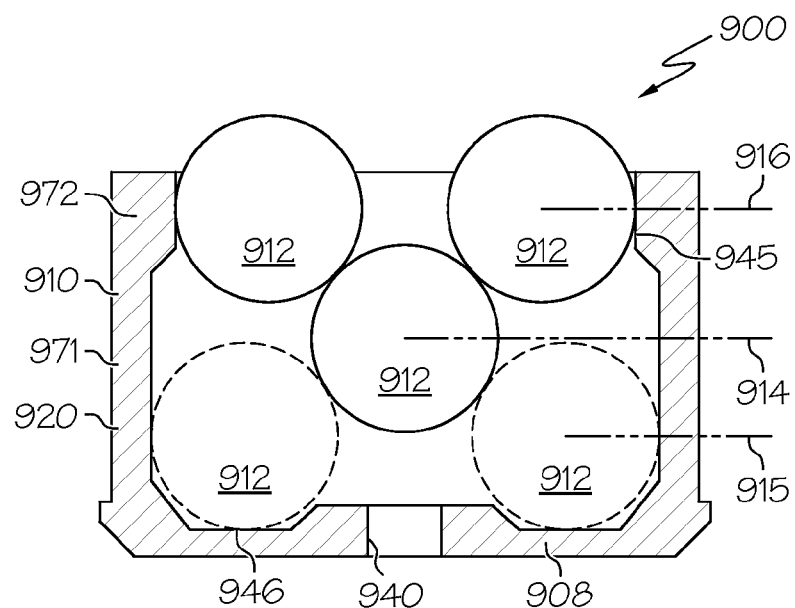
FIG. 9 shows another embodiment of a vibration isolator.
Figure 10:
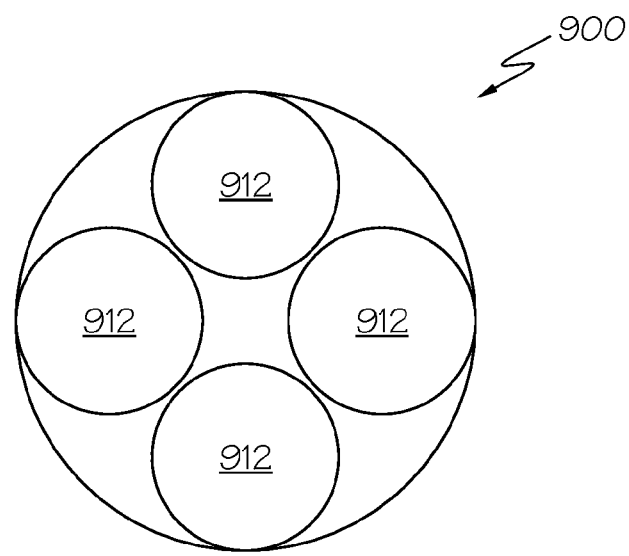
FIG. 10 shows a plan view of a portion of an embodiment of a vibration isolator.

FIGS. 9 and 10 show side and top views, respectively, of an embodiment of an isolation device 900. Bearings 912 are shown in a first layer 914, a second layer 915, and a third layer 916. The first layer 914 has one bearing 912, the second layer 915 has at least three (3) bearings 912 and the third layer 916 has four (4) bearings 912. Bearings 912 are disposed within a housing 920. The housing 920 has a hole 940.

In some embodiments, each layer having multiple bearings comprises a unique number of bearings, such that no layer having multiple bearings includes the same number of bearings.

The housing 920 has a base portion 908 and a wall portion 910. Base portion 908 has an annular groove 946. Bearings 912 of the second layer 915 are disposed in the annular groove 946. Bearings 912 of the second layer 915 are in contact with the base portion 908.

Wall portion 910 has a first wall portion 971 and a second wall portion 972. Bearings 912 of the second layer 915 are in contact with the first wall portion 971. Bearing 912 of the first layer 914 are disposed on bearings 912 of the second layer 915. Bearings 912 of the third layer 916 are disposed on bearing 912 of the first layer 914.

The second wall portion 972 comprises a raised flange 945. As shown in FIG. 9, the raised flange 945 is arranged circumferentially along the interior of the second wall portion 972. Bearings 912 of the third layer 916 contact the raised flange 945. The raised flange 945 is configured to minimize the area of contact with bearings 912.

The embodiment of FIG. 9 does not include a retainer (see e.g. 804 in FIG. 8A). In such an embodiment, an object supported by the isolator 900 can be placed directly on the bearings of the top layer.

Figure 11:
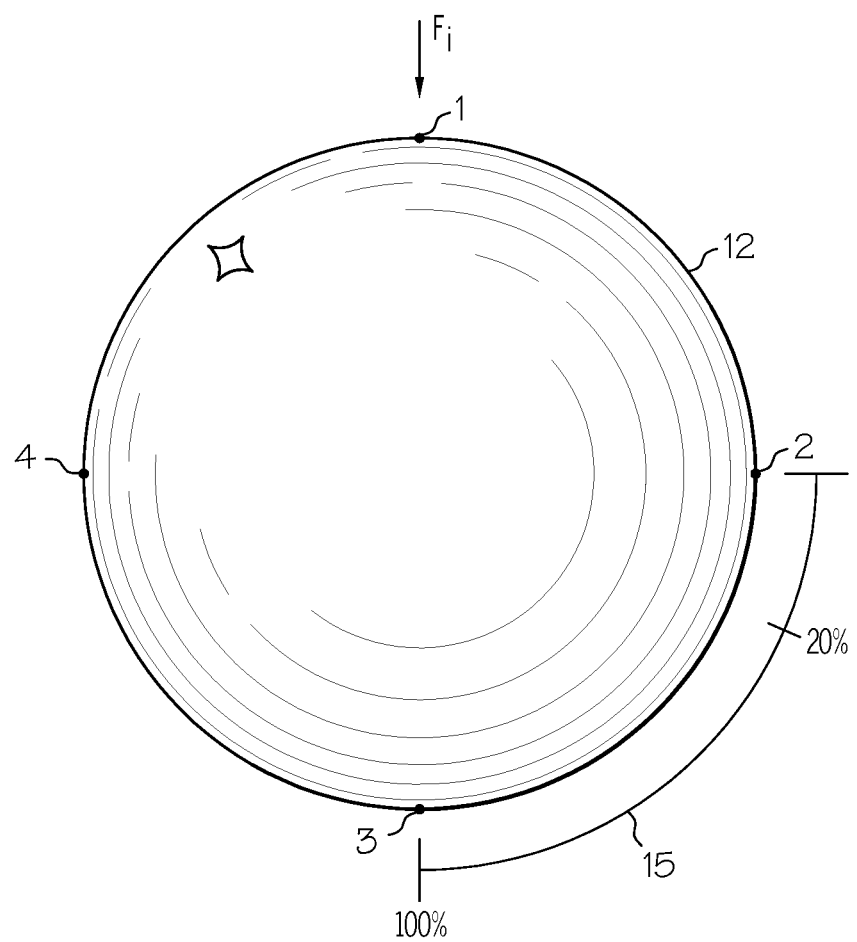
FIG. 11 shows a single representative bearing.

Turning to FIG. 11, a representative bearing 12 is shown. An input force vector $F_i$ is input into a first bearing at point 1. The input force vector $F_i$ is representative of an instantaneous incoming force, for example due to external vibrations. The force is input normal to the surface of the bearing 12. The greatest transfer of force into an adjacent bearing/supporting surface would occur co-linear (along the axis of input force) with the input force across the first bearing 12. Thus, the greatest theoretical force transfer would result if the bearing were supported at point 3 as shown on FIG. 11, wherein points 1 and 3 are diametrically opposed. In the vibration isolator described herein, it is desirable to dissipate energy and avoid high amounts of direct force transfer. Therefore, in the vibration isolators described herein, it is desirable that no bearing 12 comprises two contact points that are diametrically opposed. Transfer of force to an adjacent bearing or surface preferably occurs 'off-axis' relative to the input force on the first bearing, due to the specific arrangement of bearings inside the housing.

In FIG. 11, a contact point or surface orthogonal to the direction of input force vector $F_i$ (e.g. points 2 and 4) would provide the least reactionary force in reaction to the input force vector $F_i$. Thus, an arc 15 can be drawn between potential contact points 2 and 3, with a distance along the arc 15 representing the relative magnitude of a reactive force that would occur in reaction to the input force vector $F_i$ were a contact/support point to be placed along the arc 15. A highest amount of force would be transferred if the contact point were placed close to point 3, whereas a smallest amount of force would be transferred if the contact point were placed close to point 2. In some embodiments, it is desirable that a contact point be placed closer to a minimum reaction point 2 than to a maximum reaction point 3. For example, in FIG. 11, it would be desirable to place a contact point on the surface of the bearing 12 represented by the half of the arc 15 closest to the minimum reaction point 2. In some embodiments, it would be desirable to place a contact point on the surface of the bearing 12 represented by the 20% of the arc 15 located closest to the minimum reaction point 2.

Where the first bearing 12 is surrounded, even partially, by a fluid such as a gas, forces may be dissipated to the fluid. Thus, it is believed that by maintaining contact points closer to minimum reaction points 2 than maximum reaction points 3, fluid surrounding the bearing 12 in the area of the maximum reaction points 3 can absorb and dissipate energy.

Generally, all concave surfaces, ledges, grooves, flanges and all other bearing contacting surfaces are configured to minimize the area of contact (e.g. contacting points or patches) on the surface of the bearings.

The vibration isolators disclosed herein can be used in any suitable isolation configuration wherein isolation is desirable. In some embodiments, isolators can be used in cable management systems. For example, cables for electronic components can be bundled together, an one or more isolators can be used to support the bundle. In some embodiments, wiring or cabling can comprise a technology compartment, such as an enclosure having a cavity for circuit components, inductors or the like, and the technology compartment can be attached to an isolator.

In some embodiments, a vibration isolator can be described according to the following numbered paragraphs:

1. A vibration isolator comprising:
   a housing comprising a base portion and a wall portion;
   a plurality of bearings disposed within the housing, the bearings arranged in a configuration comprising a plurality of layers including a first layer, a second layer and a third layer; the first layer comprising a bearing; the second layer comprising a plurality of bearings, each bearing in the second layer contacting the wall portion of the housing.

2. The vibration isolator of paragraph 1, wherein each bearing comprises a plurality of contact points in contact with another portion of the vibration isolator, and no two contact points of a bearing are diametrically opposed.

3. The vibration isolator of paragraph 1, wherein the housing further comprises a retainer, the retainer contacting each bearing in the third layer.

4. The vibration isolator of paragraph 3, wherein the retainer comprises an annular groove, each bearing in the third layer contacting the annular groove.

5. The vibration isolator of paragraph 3, wherein the retainer is rotatable with respect to the wall portion.

6. The vibration isolator of paragraph 1, wherein the number of bearings in the second layer is different from the number of bearings in the third layer.

7. The vibration isolator of paragraph 1, the bearing configuration further comprising a fourth layer, the fourth layer comprising a bearing.

8. The vibration isolator of paragraph 7, wherein the bearing of the fourth layer contacts each bearing in the second layer.

9. The vibration isolator of paragraph 8, wherein the bearing of the fourth layer contacts the base portion of the housing.

10. The vibration isolator of paragraph 1, wherein at least a portion of the housing comprises a ceramic material.

11. The vibration isolator of paragraph 1, wherein at least one of said bearings comprises a ceramic material.

12. The vibration isolator of paragraph 1, wherein each of said bearings comprises a ceramic material.

13. A universal vibration isolator comprising:
   a housing;
   a retainer having a surface and at least one contact patch on that surface; and
   a plurality of bearings, each bearing having a surface and at least one contact patch on that surface;
   the bearings being disposed within the housing, the bearings arranged in at least a first layer and a second layer; the first layer having at least two bearings being disposed on the second layer, the second layer having at least one bearing; the first layer contacting at least the retainer and the second layer, the second layer contacting at least the first layer;
   a first line of contact being defined by a line normal to the surface of the retainer contacting surface at the contact patch of the bearings of the first layer and the retainer; and
   a second line of contact between the bearings of the first layer and the at least one bearing of the second layer is normal to the surface of the at least one bearing of the second layer at the contact patch;
   wherein the line of contact between the bearings of the first layer and the retainer contacting surface is nonlinear with the line of contact between the at least one bearing of the second layer and the bearings of the first layer.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Any feature described herein with respect to any particular embodiment can be used with any other suitable embodiment.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A vibration isolator comprising:
   a housing comprising a base portion and a wall portion;
   a plurality of housed bearings disposed within the housing, the housed bearings arranged in a configuration comprising a plurality of layers including a first layer and a second layer; the first layer comprising a plurality of first layer bearings; the second layer comprising a plurality of second layer bearings;
   wherein said wall portion comprises a rigid material, said rigid material continuously surrounds at least said second layer, said rigid material contacts each first layer bearing, said rigid material contacts each second layer bearing, each housed bearing comprises a plurality of contact points in contact with another portion of the vibration isolator, and no two contact points of a housed bearing are diametrically opposed.

2. The vibration isolator of claim 1, wherein the housing further comprises a retainer supported by said housed bearings.

3. The vibration isolator of claim 2, wherein the retainer contacts each second layer bearing.

4. The vibration isolator of claim 3, wherein the retainer comprises an annular groove, said annular groove contacting each of said second layer bearings.

5. The vibration isolator of claim 3, wherein the retainer comprises a conical surface, said conical surface contacting said second layer bearings.

6. The vibration isolator of claim 3, wherein the retainer is attached to a post, the post extending through the base of the housing.

7. The vibration isolator of claim 6, wherein a longitudinal axis of the post is coaxial with a central axis of the wall portion of the housing.

8. The vibration isolator of claim 1, wherein each first layer bearing contacts the base portion of the housing.

9. The vibration isolator of claim 1, wherein the number of first layer bearings is different from the number of second layer bearings.

10. The vibration isolator of claim 1, wherein the housing wall portion comprises a first wall portion offset from a second wall portion.

11. The vibration isolator of claim 10, wherein the second wall portion comprises a raised flange.

12. The vibration isolator of claim 10, wherein the first wall portion comprises an annular groove.

13. A vibration isolator comprising:
   a rigid housing comprising a rigid material defining a first wall portion and a second wall portion offset from said first wall portion;
   a plurality of housed bearings being disposed within the housing, the housed bearings arranged in a plurality of layers including a first layer and a second layer; the second layer having a plurality of second layer bearings, the first layer having a plurality of first layer bearings;
   wherein said first wall portion contacts said first layer bearings and said second wall portion contacts said second layer bearings, and said housed bearings include at least one given bearing that comprises at least three contact points, and reference lines that extend from a centroid of said given bearing through one of said contact points comprise a first line of contact, a second line of contact and a third line of contact, said first line of contact being non-collinear with said second line of contact, said first line of contact being non-collinear with said third line of contact, and said second line of contact being non-collinear with said third line of contact.

14. The vibration isolator of claim 13, wherein said plurality of layers comprises a third layer comprising a third layer bearing, said third layer bearing contacting each first layer bearing.

15. The vibration isolator of claim 14, further comprising a retainer supported by said housed bearings.

16. The vibration isolator of claim 15, wherein said second layer comprises a different number of bearings than said first layer.

17. The vibration isolator of claim 10, wherein said first wall portion contacts said first layer bearings and said second wall portion contacts said second layer bearings.

18. The vibration isolator of claim 1, said plurality of layers including a third layer, the third layer comprising a third layer bearing, said third layer bearing positioned between said first layer and said second layer.

19. The vibration isolator of claim 1, said plurality of layers including a third layer, the third layer comprising a third layer bearing, said third layer bearing contacting said base portion.

20. The vibration isolator of claim 19, said plurality of layers including a fourth layer, the fourth layer comprising a fourth layer bearing, said fourth layer bearing positioned between said first layer and said second layer.

* * * * *